March 25, 1924.
E. G. HINES ET AL
DISH DRAINER
Filed April 4, 1922
1,487,942
2 Sheets-Sheet 1
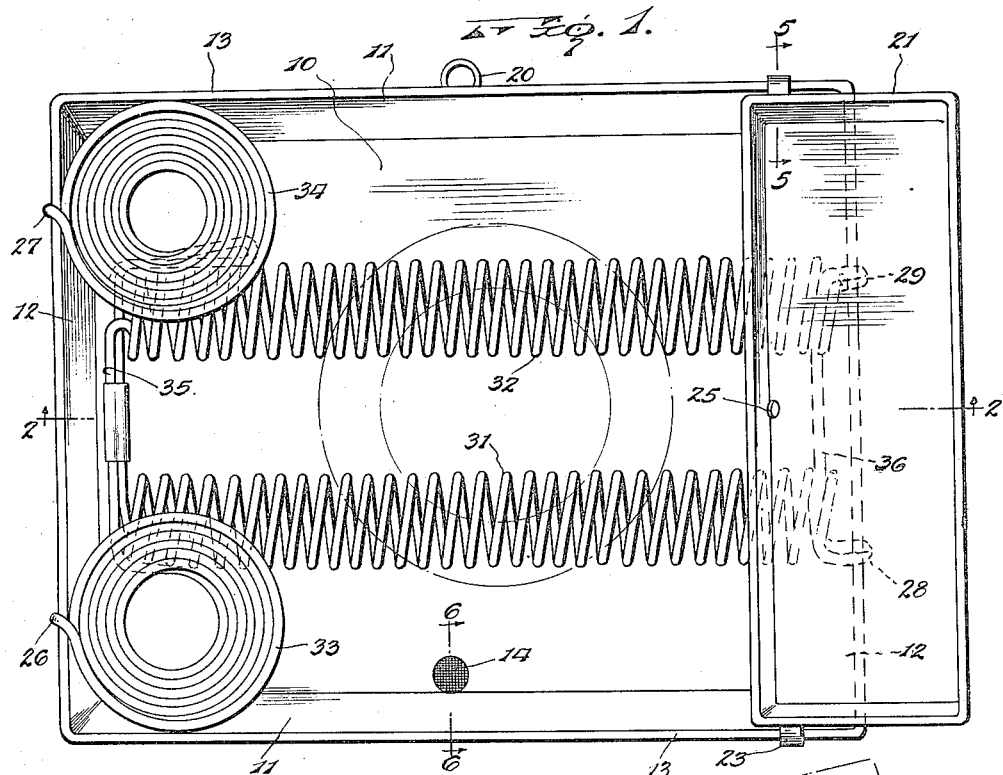
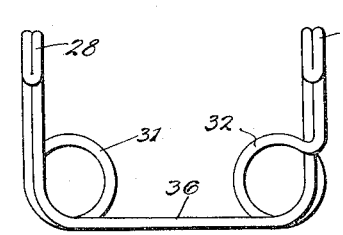
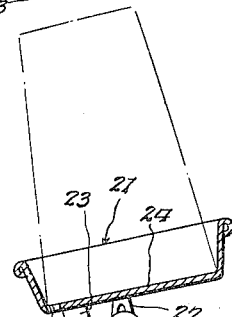
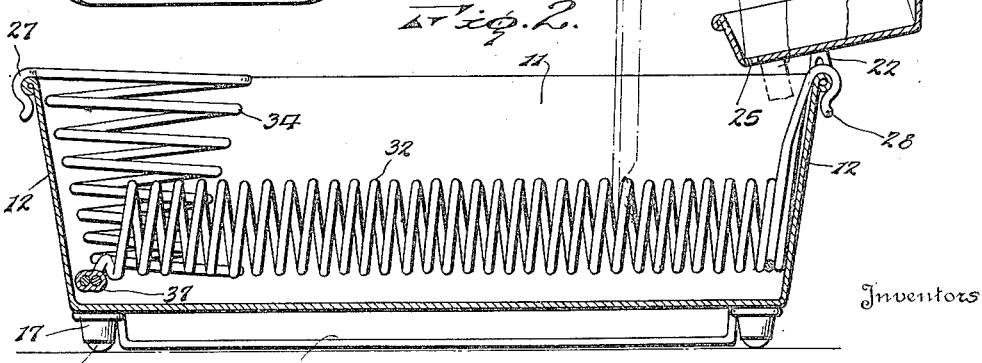
Inventors
E. G. Hines.
A. S. Stover.
By Lacy & Lacy, Attorneys

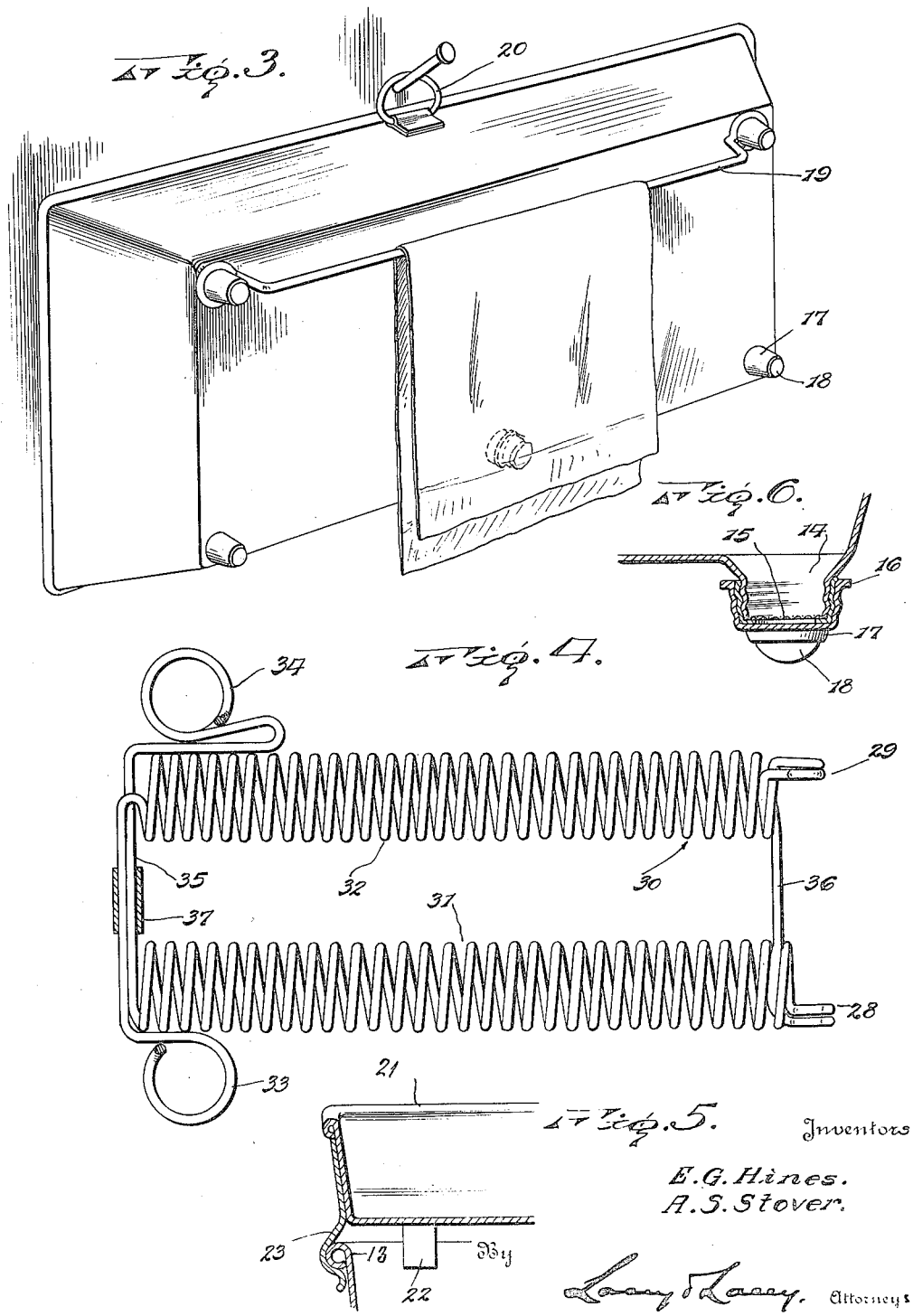

Patented Mar. 25, 1924.

1,487,942

UNITED STATES PATENT OFFICE.

EDWIN G. HINES AND ANNA S. STOVER, OF WEATHERLY, PENNSYLVANIA.

DISH DRAINER.

Application filed April 4, 1922. Serial No. 549,544.

*To all whom it may concern:*

Be it known that we, EDWIN G. HINES and ANNA S. STOVER, citizens of the United States, residing at Weatherly, in the county of Carbon and State of Pennsylvania, have invented certain new and useful Improvements in Dish Drainers, of which the following is a specification.

The present invention relates to dish drainers and the main object of the invention is to provide a dish drainer with special features for depositing sundry articles therein and for facilitating the sterilizing, draining and drying thereof. For this purpose, the drainer is furnished with horizontally and vertically extending coil nests in and upon which dishes and cutlery may be placed in a convenient and accessible manner in order that boiling water may be poured over them for a thorough sterilization before draining and drying.

One advantage of the invention is that the pan, when not in use as a sterilizing, draining and drying pan, may be used as a dish pan after the coil nests have been removed and its construction is such that it can be easily cleaned and kept perfectly sanitary.

Another advantage is when not otherwise used, the pan may be hung up and will in that position constitute a convenient rack for dish-cloths and towels.

Still another advantage resides in the fact that the dish drainer is very strongly built and can, for that reason, stand a considerable amount of rough handling.

In the accompanying drawings one embodiment of the invention is illustrated; and Figure 1 is a top plan view of the dish drainer assembled;

Figure 2 is a longitudinal sectional view along line 2—2 of Figure 1;

Figure 3 is a perspective view of the dish drainer serving as a towel rack;

Figure 4 is a top plan view, partly in section, of the coil nests;

Figure 5 is a fragmentary transverse sectional view along line 5—5 of Figure 1;

Figure 6 is a fragmentary, transverse sectional view along line 6—6 of Figure 1; and Figure 7 is an end view of Figure 4.

In the drawings, the dish drainer proper is represented by the reference numeral 10 and is of rectangular shape with slightly inclined side walls 11 and end walls 12, said walls being suitably connected at the corners and having their top edges 13 rolled or beaded. The bottom of the dish drainer is provided with a drain hole 14 which preferably has a sieve 15 inserted therein and is provided with a cap 16 to close the drain hole at its outer side. A foot 17 is placed in each corner and each foot is provided with a ball or roller 18 to facilitate moving of the drainer. Between a pair of the feet 17, a rod 19 is stretched and this rod constitutes a towel rack when the dish drainer is hung up by its ring 20 upon a wall.

An auxiliary pan 21, constructed in the same manner as the dish drainer, its length being approximately the width of the dish drainer, is detachably mounted on one end of the latter. For this purpose, fingers 22 are provided under the bottom of the auxiliary pan and each end has a clip 23 intended to snap over the adjacent beaded edges 13 of the sides 11 of the dish drainer so as to hold the auxiliary pan firmly secured on the drainer. As best seen in Figure 2, the position of the auxiliary pan is such that its bottom 24 is tilted slightly inward with regard to the dish drainer and one or more drain holes 25 are provided at the lower end of the bottom so that water collected in the auxiliary pan will drain off through the hole or holes into the dish drainer. This auxiliary pan is intended to receive glasses and small dishes, as indicated in dotted lines in Figure 2.

Inside the drainer is suspended, on hooks 26, 27, 28 and 29, a resilient rack 30 intended to hold dishes, crockery and cutlery while they are being sterilized or to be drained and dried. This rack consists of two helical coil nests 31 and 32 extending longitudinally of the dish drainer and spaced slightly above the bottom thereof. A pair of conical coil nests 33 and 34, connected at one end of the helical nests, reach up from the latter to the top of the dish drainer and are disposed with their bases uppermost. Between the ends of the helical nests are spacing members 35 and 36 which are intended to hold the nests in rigid connection and at a certain distance from each other. As seen in Figure 2, when the nests are inserted in the dish drainer, the dishes may be stuck in between the coils of the helical nests or laid on top thereof for sterilizing, draining and drying and spoons and cutlery may be deposited in the vertically positioned conical nests 33 and 34 for a similar purpose.

The nests with their connections and hooks, are preferably made out of a single, continuous piece of suitable wire in the following manner: Commencing at one end of the wire and forming a short hook 26, the wire is thereupon coiled to form the downwardly tapered conical nest 33, the bottom end of the wire continuing across to provide the spacing member 35 and thence continued to form the helical coil nest 32, at the opposite end of which the wire is directed upwardly to form the hook 29 and is doubled upon itself and extended downwardly and across to provide the spacing member 36, then to form the hook 28, from where the wire is taken in reverse direction to form the helical coil nest 31, at the opposite end of which a straight portion of the wire extends across as part of the spacing member 35 and finally is coiled to form the conical nest 35 with its base uppermost, ending with the hook 27.

In order to insure a firm connection between the two straight portions of the wire forming the spacing member 35, a sleeve 37 may be provided, preferably made out of a piece of sheet metal rolled around the said portions of the wire.

After the sterilizing, draining and drying have been performed, the auxiliary pan 21 and the rack 30 may be removed from the dish drainer and each cleaned and dried separately, whereupon the dish drainer may be hung up by its ring 20, as seen in Figure 3, when the rod 19 may be used as a rack for dish cloths and towels.

In using the device for rinsing and washing fruit and vegetables such as spinach, lettuce, celery and the like, the coils are first removed from the drainer and for instance the spinach leaves are then put in the large drainer and fresh water poured over them. This will remove sand and dirt which will pass out through the drain hole 14 in the bottom of the drainer. After the sand has in this manner been removed, the leaves are thereupon placed in the auxiliary pan for draining off the water that still remains upon them.

Having thus described the invention, what is claimed as new is:

1. In a dish drainer, a continuous wire coiled to form horizontally and vertically positioned coil nests, hooks being formed on the wire for suspending the nests above the bottom of the drainer, said hooks being situated at the upper ends of said vertical nests and at the remote ends of said horizontal nests.

2. In a dish drainer, a continuous wire coiled to form a pair of helical nests interconnected at both ends, and a pair of conical coil nests with their bases uppermost and each terminating with a hook at the remote ends of said nests for suspending the nests above the bottom of the drainer.

3. In a dish drainer, a continuous wire coiled to form a pair of helical nests interconnected at both ends, and a pair of conical coil nests with their bases uppermost and each terminating with a hook at the upper end for suspending the nests above the bottom of the drainer, said conical nests and hooks being situated at one end of said helical nests, other hooks being formed at the opposite end of the helical nests by doubling the wire upon itself.

In testimony whereof we affix our signatures.

EDWIN G. HINES. [L. S.]
ANNA S. STOVER. [L. S.]